United States Patent
Backhaus (10) Patent No.: US 12,009,535 B2
(45) Date of Patent: Jun. 11, 2024

(54) BATTERY POWER SUPPLY FOR AN INDUSTRIAL TRUCK USED IN A POTENTIALLY EXPLOSIVE AREA

(71) Applicant: Stöcklin Logistik AG, Laufen (CH)

(72) Inventor: Joerg Backhaus, Laufen (CH)

(73) Assignee: KTM AG, Mattighofen (AT)

( * ) Notice: Subject to any disclaimer, the term of this patent is extended or adjusted under 35 U.S.C. 154(b) by 909 days.

(21) Appl. No.: 16/962,604

(22) PCT Filed: Jan. 4, 2019

(86) PCT No.: PCT/EP2019/050136
§ 371 (c)(1),
(2) Date: Jul. 16, 2020

(87) PCT Pub. No.: WO2019/141524
PCT Pub. Date: Jul. 25, 2019

(65) Prior Publication Data
US 2021/0091438 A1    Mar. 25, 2021

(30) Foreign Application Priority Data
Jan. 17, 2018 (DE) .................. 10 2018 100 912.7

(51) Int. Cl.
*H01M 50/271* (2021.01)
*B66F 9/075* (2006.01)
(Continued)

(52) U.S. Cl.
CPC ....... *H01M 50/202* (2021.01); *B66F 9/07531* (2013.01); *H01M 4/5825* (2013.01);
(Continued)

(58) Field of Classification Search
CPC .. H01M 50/202; H01M 50/20; H01M 50/213; H01M 50/24; H01M 50/249;
(Continued)

(56) References Cited

U.S. PATENT DOCUMENTS 2,471,585 A * 5/1949 Rittenhouse ........ H01M 50/627
429/86
4,098,963 A * 7/1978 Mocas ................ H01M 50/308
429/88
(Continued)

FOREIGN PATENT DOCUMENTS

CH          711607 A2 *  4/2017
CN         1468052 A  *  1/2004
(Continued)

OTHER PUBLICATIONS

Japan Patent Office, non-final Office Action (English translation) on Japanese Patent Application No. 2020-560547 (corresponding to U.S. Appl. No. 16/962,604); Jan. 24, 2023.

*Primary Examiner* — Nghia M Doan
(74) *Attorney, Agent, or Firm* — Rod D. Baker (57) ABSTRACT

A battery power supply (1) for an industrial truck (8) used in a potentially explosive area is provided, having a housing (2) having a housing body (47) and a lid (4), wherein the housing body (47) has a receiving chamber (48) for receiving a battery tray (3) that has an inner chamber (20) having a traction battery (25) arranged therein, and the lid (4) is releasably placed on the housing body (47) using securing means (53), and the battery tray (3) has a battery tray lid (49) and a base (26) having walls (17, 18) extending away from the base (26), wherein, in a region adjacent to the base (26), at least one wall (17, 18) has a recess (19) penetrating the wall (17, 18) into the inner chamber (20).

18 Claims, 7 Drawing Sheets

(51) Int. Cl.
| | | |
|---|---|---|
| *H01M 4/58* | (2010.01) | |
| *H01M 10/0525* | (2010.01) | |
| *H01M 10/42* | (2006.01) | |
| *H01M 50/20* | (2021.01) | |
| *H01M 50/202* | (2021.01) | |
| *H01M 50/213* | (2021.01) | |
| *H01M 50/24* | (2021.01) | |
| *H01M 50/249* | (2021.01) | |
| *H01M 50/253* | (2021.01) | |
| *H01M 50/262* | (2021.01) | |
| *H01M 50/284* | (2021.01) | |
| *H01M 50/383* | (2021.01) | |
| *H02J 7/00* | (2006.01) | |

(52) U.S. Cl.
CPC ..... *H01M 10/0525* (2013.01); *H01M 10/425* (2013.01); *H01M 50/20* (2021.01); *H01M 50/213* (2021.01); *H01M 50/24* (2021.01); *H01M 50/249* (2021.01); *H01M 50/253* (2021.01); *H01M 50/262* (2021.01); *H01M 50/271* (2021.01); *H01M 50/284* (2021.01); *H01M 2010/4271* (2013.01); *H01M 2010/4278* (2013.01); *H01M 2220/20* (2013.01); *H02J 7/0045* (2013.01)

(58) Field of Classification Search
CPC ............ H01M 50/253; H01M 50/262; H01M 50/271; H01M 50/284; H01M 50/383; H01M 50/30; H01M 10/0525; H01M 10/425; H01M 2010/4271; H01M 2010/4278; H01M 2220/20; B66F 9/07531; H02J 7/0045
See application file for complete search history.

(56) References Cited

U.S. PATENT DOCUMENTS

| | | | | |
|---|---|---|---|---|
| 4,400,450 A | * | 8/1983 | Wagner | H01M 10/16 |
| | | | | 429/89 |
| 5,441,123 A | | 8/1995 | Beckley | |
| 6,494,279 B1 | * | 12/2002 | Hutchens | H01M 50/249 |
| | | | | 180/68.5 |
| 6,497,978 B1 | * | 12/2002 | Takada | H01M 50/3425 |
| | | | | 429/57 |
| 8,007,047 B2 | * | 8/2011 | Kennedy | E04H 9/12 |
| | | | | 299/12 |
| 8,450,004 B2 | * | 5/2013 | Titschert | H01M 50/121 |
| | | | | 429/96 |
| 8,592,063 B1 | * | 11/2013 | Musetti | H01M 50/308 |
| | | | | 137/511 |
| 8,797,830 B2 | * | 8/2014 | Baliga | B06B 1/0618 |
| | | | | 361/679.01 |
| 9,917,428 B2 | * | 3/2018 | Rice | H02G 3/16 |
| 10,912,963 B2 | * | 2/2021 | Lian | A62C 35/08 |
| 2020/0136111 A1 | * | 4/2020 | Jiang | F16K 17/003 |

FOREIGN PATENT DOCUMENTS

| | | | | | |
|---|---|---|---|---|---|
| CN | 101394618 A | * | 3/2009 | | |
| CN | 101599880 A | * | 12/2009 | | |
| CN | 101924193 A | * | 12/2010 | | |
| CN | 102800894 A | * | 11/2012 | | |
| CN | 102810896 A | * | 12/2012 | | |
| CN | 202772212 U | | 3/2013 | | |
| CN | 102047467 B | * | 8/2013 | ......... | H01M 2/0242 |
| CN | 103312027 A | * | 9/2013 | | |
| CN | 203787293 U | * | 8/2014 | | |
| CN | 104333232 A | * | 2/2015 | ............... | H02B 1/24 |
| CN | 204538114 U | | 8/2015 | | |
| CN | 105514312 A | * | 4/2016 | | |
| CN | 205488328 U | * | 8/2016 | | |
| CN | 106340602 A | * | 1/2017 | | |
| CN | 205985149 U | * | 2/2017 | | |
| CN | 106654114 A | * | 5/2017 | ......... | H01M 2/1241 |
| CN | 106706756 A | * | 5/2017 | | |
| CN | 106910853 A | * | 6/2017 | | |
| CN | 106953120 A | * | 7/2017 | ......... | H01M 10/058 |
| CN | 206595310 U | | 10/2017 | | |
| CN | 107482141 A | * | 12/2017 | ......... | H01M 10/613 |
| CN | 206711939 U | * | 12/2017 | | |
| CN | 209730030 U | * | 12/2019 | | |
| DE | 9312089 U1 | | 11/1993 | | |
| DE | 202 03 258 U1 | | 8/2002 | | |
| DE | 69837842 T2 | * | 10/2007 | ......... | H01M 2/1241 |
| EP | 1 258 931 A1 | | 11/2002 | | |
| EP | 0 989 618 B1 | | 3/2003 | | |
| EP | 2 945 215 A2 | | 11/2015 | | |
| GB | 2411287 A | * | 8/2005 | ........ | H01M 10/0565 |
| GB | 2506015 A | * | 3/2014 | ............. | H02J 3/383 |
| JP | 2011 054353 A | | 3/2011 | | |
| JP | 2012074198 A | * | 4/2012 | | |
| JP | 2014116305 A | * | 6/2014 | ......... | G06F 1/1635 |
| UA | 88803 U | * | 3/2014 | | |

* cited by examiner

BATTERY POWER SUPPLY FOR AN INDUSTRIAL TRUCK USED IN A POTENTIALLY EXPLOSIVE AREA

The present invention relates to a battery power supply for an industrial truck used in a potentially explosive area, having a housing having a housing body and a cover, wherein the housing body has a receiving chamber for receiving a battery tray, which has an inner chamber having a traction battery arranged therein, and the cover being releasably fixable to the housing body by securing means, and the battery tray has a battery tray cover and a base having walls extending away from the base, according to the preamble of claim 1.

Electromotively operated industrial trucks are often also used in potentially explosive areas, such as in the chemical or pharmaceutical industry, for example, and such industrial trucks may only be operated with power supply sources that are approved for use according to applicable ignition protection type regulations, for example the ATEX directive and, here in particular, are certified according to 2G or 2D device categories of ATEX directive 2014/34/EU.

Such industrial trucks must thus be operated with electrical energy supply sources which, on one hand, provide sufficient power and, on the other hand, are mounted in housings which are permitted according to the regulations mentioned above. To date, lead-acid batteries that are arranged in a corresponding housing are mainly used as electrical energy supply sources.

A substantial disadvantage of such battery power supplies based on lead-acid batteries is that these are not suitable for a multi-shift operation with only a single battery power supply for a day shift of the industrial truck, since they do not have enough capacity, and it is thus necessary to have several such battery power supplies ready per industrial truck, which have to be exchanged during a day shift and also have to be recharged after this.

For the charging operation of such battery power supplies based on lead-acid batteries, facilities separate from the potentially explosive operating area are necessary, which have to be connected to a fresh air supply because of the formation of acid fumes that emerge when charging and because of the danger of oxyhydrogen gas forming and which have to be provided with an exhaust system, which, on one hand, clearly increases handling expenditure and, on the other hand, also contributes to an increase in operating costs of the industrial trucks equipped in this manner.

If such battery power supplies based on lead acid are used, it is usually necessary to have three to four battery power supplies ready per industrial truck for a day shift, from which the considerable expenditure mentioned above immediately becomes apparent.

It is thus desirable to reduce this expenditure by using other electrical energy supply sources.

A battery power supply for underground mining is known from DE 10 2004 008 569 A1, which has a pressure-resistant battery housing having lithium battery cells arranged therein and whose characterising feature is that an intrinsically safe circuit for overpower limitation and/or over-voltage limitation is provided in the battery housing. The battery housing known from this has a battery tray and an additional housing coupled to it, in which the intrinsically safe circuit is arranged, wherein lithium battery cells can be found arranged in the pressure-resistant housing, which are selected form the series of lithium ion battery cells, lithium polymer battery cells or lithium battery cells having a fluid electrolyte.

The wall thickness of the surrounding walls of the battery housing and the cover as well as the screwed connection between said components are here designed in such a way that the battery housing remains sealed in a pressure and gas-tight manner when an explosion with a specific maximum explosion pressure occurs in the inner chamber of the battery housing, said explosion pressure being determined by the maximum burst pressure to be expected with lithium battery cells.

A traction battery is known from EP 2 945 215 B1, which is provided for industrial trucks and puts battery cells to use which are based on lithium-polymer technology, lithium-cobalt dioxide technology, lithium-manganese technology, lithium-titanate technology or lithium-iron phosphate technology. In addition, this known traction battery is provided with a battery management system for exchanging data with the industrial truck and/or a charging device. Yet this known traction battery has absolutely no properties which would permit an indication of its use in the potentially explosive area.

Based on this, the object underlying the present invention is to create a battery power supply for industrial trucks used in the potentially explosive area, said battery power supply on the one hand being permitted for use in zones having gas and dust and, on the other hand, reducing the handling effort described above and additionally being formed in such a way that, in the event of danger, unexpectedly high explosion pressures in the housing of the battery power supply do not lead to the housing bursting. An industrial truck having such a battery power supply is also to be provided.

To solve this object, the invention has the features specified in claim 1. Advantageous embodiments of this are described in the further claims. The industrial truck created according to the invention has the features specified in claim 14.

The invention creates a battery power supply for an industrial truck used in a potentially explosive area having a housing having a housing body and a cover, wherein the housing body has a receiving chamber for receiving a battery tray, which has an inner chamber having a traction battery arranged therein, and the cover being releasably fixable to the housing body by securing means, and the battery tray has a battery tray cover and a base having walls extending away from the base, wherein, in a region adjacent to the base, at least one wall has a recess penetrating the wall up to the inner chamber.

Using the battery power supply according to the invention, it achieved that, in the event of an explosion, occurring in the battery tray, of the traction battery used therein, the explosion pressure is reduced to such an extent on at least one wall of the battery tray via the at least one recess, formed to be flameproof, in a region adjacent to the base that the battery tray bursting and/or the lid lifting or being released from the battery tray in an uncontrolled manner is avoided.

In this way, the explosion pressure can be prevented by releasing the pressure from the inner chamber or receiving chamber of the battery tray into the surroundings of the battery tray without releasing any flames caused by the explosion inside the battery tray towards the outside of the battery tray, such that there is no longer the danger of the battery tray bursting uncontrollably and/or the lid being partially or completely separated from the battery tray in an uncontrolled manner.

As a result of the arrangement of the at least one recess on a wall of the battery tray in a region adjacent to the base, it is achieved that a pressure peak formed by superposing an explosion wave inside the battery tray with a superposition wave and thus with an explosion wave with higher pressure than the pressure of the primary explosion wave can be reduced to a pressure below the bursting pressure of the battery tray and also that the application of force acting on the lid of the battery tray from the inner chamber of the battery tray out does not lead to the lid rising or separating from the battery tray in an uncontrolled manner. By relieving the higher pressure to a level below the battery tray, the configuration also leads to such a bursting pressure not being relieved in an uncontrolled manner as an explosion outside the battery tray, which could also lead to the housing of the battery power supply surrounding the battery tray being at risk of bursting, such that there would no longer be an explosion protection against the housing of the battery power supply bursting. By relieving the higher pressure inside the housing of the battery power supply in a controlled manner, the danger of the housing of battery power supply bursting is eradicated.

Also, by means of this controlled pressure relief inside the housing of the battery power supply, it is ensured that the lid of the housing of the battery power supply remains on the housing body of the housing in a predetermined manner and the situation does not arise that a cavity appears between the lid of the housing and the housing body, which cavity would make it possible for oxygen to penetrate from the surroundings into the inner chamber or receiving chamber of the housing. Such a penetration of oxygen could occur in the event of an expansion of the bursting pressure inside the receiving chamber as a result of a cavity forming between the lid and housing of the battery power supply, which is prevented by the configuration according to the invention.

According to a development of the invention, it is provided that, when seen in top-view, the base of the battery tray has a rectangular configuration with longitudinal sides and transverse sides, and the longitudinal sides have a longitudinal extension which is greater than the longitudinal extension of the transverse sides, and, to form the inner chamber, the walls extend at an angle to the base away from it, and the walls arranged on the transverse sides have a penetrating recess arranged in the region of the centre of the longitudinal extension of the respective wall and the walls arranged on the longitudinal sides respectively have two penetrating recesses, which are arranged on opposite end regions of the longitudinal sides of the respective wall.

As part of the development of the battery power supply according to the invention, it has specifically been shown that, in the event of an explosion to be assumed as the worst-case scenario in the inner chamber of the battery tray, a superimposition wave or superposition wave is formed based on the initial explosion wave, which is formed by explosion waves running back and forth between the base of the battery tray and the lid of the battery tray, and the superposition wave leads to a massive pressure increase relative to the pressure of the initial explosion wave, which could lead to an unintentional lifting of the lid from the battery tray and thus to an uncontrolled release of the superposition pressure from the battery tray in the event of the battery tray impinging on the lid.

By forming the at least one recess in a wall of the battery tray adjacent to the base of the battery tray, the excessive pressure formed by the superposition wave or superposition pressure can be relieved from the inner chamber of the battery tray in a safe manner to outside the inner chamber or the receiving chamber of the battery tray, such that the danger of the battery tray bursting and/or the lid lifting off from the battery tray can be minimised or eliminated. In particular, it has been shown that the excessive inner pressure in the inner chamber of the battery tray can be safely relieved to outside the battery tray by forming a respective recess on each wall on the two transverse sides of the battery tray and by respectively forming two recesses on each wall of the two longitudinal sides of the battery tray to such an extent that the danger of the lid of the battery tray releasing in an uncontrolled manner and/or an unintentional gap forming between the lid of the battery tray and the peripheral walls of the battery tray can be avoided.

The pressure relieving to the outside from the battery tray remains in the inner chamber of the housing, i.e. in the inner chamber between the housing body and the lid of the housing of the battery power supply, such that no explosion gases and also no flames caused by the explosion can reach the outside via the housing of the battery power supply, said housing being formed without cavities in the potentially explosive surroundings and being encapsulated in a pressure-resistant manner.

It has also been shown that this configuration eliminates the danger of a cavity opening up between the housing body and the lid of the housing body, which cavity would promote an influx of oxygen from the surroundings of the housing into the inner chamber of the housing and into the inner chamber of the battery tray, which, when the lid remains on the battery tray, can be avoided despite an explosion in the inner chamber of the battery tray and thus results in an immediate suffocation of a flame front forming as a result of the explosion, and, in this way, a flame front escaping from the inner chamber of the battery tray and from the inner chamber of the housing to the outside of the housing can be avoided.

According to a development of the invention, it is also provided that the recesses are formed as rectangular wall apertures penetrating the respective wall. For example, this simplifies the manufacture of the walls of the battery tray, since the wall apertures can be formed by means of a water jet cutting process, for example, since the walls of the battery tray can be produced from a metallic substance, in particular a steel alloy, and, in this way, the recesses can also be produced in a cost-efficient manner with walls with a larger wall thickness.

According to a development of the invention, it is also provided that the recesses are formed on the base-side end region of the inner chamber of the battery tray and have an overall surface, which reduces a test explosion inner pressure triggered by a test explosion occurring in the housing as part of a type examination of the housing to a permissible inner pressure prevailing in the battery tray which is smaller than the explosion inner pressure that opens the battery tray and/or the closed housing.

As part of the type examination of the housing of the battery power supply according to the invention, the battery tray was filled with a test gas and a controlled explosion was precipitated in the inner chamber of the battery tray by means of an electric ignition, and the resulting explosion inner pressure in the inner chamber of the battery tray was measured at several points distributed in the vertical direction of the battery tray, and here it has been shown that a layered pressure distribution is set in the inner chamber of the battery tray, which is achieved by the explosion wave travelling back and forth several times between the base and the lid of the battery tray, and, in this way, it results in a formation of a superposition wave as a result of the reflections on the base and the lid of the battery tray, said superposition wave having a substantially higher pressure level than the pressure level of the initial explosion wave.

By arranging the at least one recess and, in particular the recesses, on the transverse walls and longitudinal walls of the battery tray at the points specified above, the superposition pressure in the inner chamber of the battery tray can be relieved to the outside of the battery tray without resulting in the danger of an uncontrolled deformation opening a cavity surface of the housing of the battery power supply or the battery tray being destroyed, and the superposition wave thus being able to leave the inner chamber of the battery tray and the inner chamber or receiving chamber of the housing of the battery power supply according to the invention in an uncontrolled manner.

According to a development of the invention, it is also provided that the recesses are arranged on the base-side end region of the inner chamber of the battery tray above the base in a region on which a superposition wave occurs which is caused by an explosion triggered in the housing, which could also be caused by an explosion of battery cells of the traction battery. This configuration leads to the maximum pressure occurring as a result of the superposition wave in the region of the base of the battery tray being able to be relieved from the inner chamber of the battery tray without any potential flame front being able to leave the inner chamber of the battery tray via the flameproof recesses.

It has specifically been shown that the flame front, which emerges in the inner chamber of the battery tray as a result of the explosion, travels upwards in the upright battery tray as a result of the pressure excess in the inner chamber of the battery tray in the region of the base and as a result of oxygen distribution caused by this by enriching the oxygen in the region of the lid, i.e. is directed away from the recesses formed on the base of the battery tray, and this does not thus result in an outward penetration of the flame front out of the battery tray housing.

Here, because of the configuration of the battery tray explained below in more detail, the flame front is extinguished and is thus kept inside the battery tray without penetrating outwards.

According to a development of the invention, it is provided that a finely processed cavity surface with a predetermined cavity surface width and an average roughness of less than or less than or equal to 6.3 μm is formed between a cover surface facing towards the housing body and a surface of the housing body facing towards the lid. This configuration leads to the flame front being extinguished as already stated, since an influx of oxygen from the surroundings into the inner chamber of the housing and/or the battery tray is avoided using this finely processed cavity surface with a predetermined cavity surface width and an average roughness of less than or less than or equal to 6.3 μm, and thus the flame front is extinguished in the inner chamber.

According to a development of the invention, it is also provided that the lid is releasably placed on the housing body of the housing by means of a plurality of screw connections, and the screw connections are provided to run along an outer periphery line of the lid and are arranged at a predetermined spacing apart from one another. The predetermined spacing of the screw connections is, in particular, a spacing ranging from 30 to 80 mm, in particular 50 to 65 mm, between the screw connections, and thus a closing force is achieved in the cavity surface which prevents an influx of oxygen into the inner chamber, whereby the flame front is extinguished.

According to a development of the invention, it is also provided that an intermediary lid that can be placed between the receiving chamber and an underside of the battery tray lid is provided, said intermediary lid forming a receiving chamber between an upper side of the intermediary lid and the underside of the battery tray lid and being formed to receive an electronic circuit.

Using this configuration, it is achieved that a receiving chamber separated from the battery cells of the traction battery is formed in the battery tray, said receiving chamber being formed to receive an electronic circuit or printed circuit board, which, for example, serves for communication or data exchange between the sensors monitoring the state of the battery cells and a controller or control device of the industrial truck and/or an external charging device for charging the battery cells.

According to a development of the invention, it is also provided that the battery power supply and, in particular the battery tray, is provided with cable screw joints for providing an electrical charging connection for charging the traction battery and an electrical output connection for providing electrical energy for the industrial truck.

The cable screw connections can be type-tested cable screw connections which are permitted as part of a test of the battery power supply according to the invention and must be maintained. In a similar manner, an electrical charging connection for charging the traction battery and an electrical output connection for providing electrical energy for the industrial truck can also be provided on the battery tray by such cable screw connections.

According to a development of the invention, it is also provided that the battery power supply has a load current circuit that can be switched with a contactor for operating the industrial truck and a charging power circuit that can be switched with a contactor for charging the traction battery. Here, a configuration is possible which switches the load power supply for operating the industrial trick, i.e. driving the industrial truck, raising or lowering load conveyance means of the industrial truck without power by means of the contactor as soon as the charging power circuit is freely switched for feeding a charging current into the battery cells by means of a contactor of the charging power circuit. In this way, a simultaneous operation of the industrial truck and charging the battery cells is prevented.

According to a development of the invention, it is also provided that the battery power supply has an attachment device, which can be externally switched and is coupled to the contactors, in such a way that the external circuit or externally triggered circuit alternately switches the load power circuit without power, and the charging power circuit is through-connected in such a way that the load power circuit is without power when the charging power circuit is switched, whereby the simultaneous operation of the industrial truck and charging the battery cells of the battery power supply, already mentioned above, is avoided.

According to a development of the invention, it is also provided that the battery power supply has an interface device, in particular in the form of a CAN-bus interface device for exchanging data and/or signals between the electronic circuit functionally coupled with the traction battery and an external charging device for charging the traction battery. This configuration enables a master-slave configuration between the traction battery and the external charging device, such that state data of the battery cells, for example, is transmitted via the electronic circuit device to the external charging device and thus a charge compensation process or charge balance process is possible for charging and/or operating the battery cells of the traction battery.

According to a development of the invention, it is also provided that the traction battery is formed from a plurality of lithium phosphate cells, which are arranged extensively in parallel to the base of the battery tray, and cavities are formed between the cells for gaseous fluid to pass through out of the inner chamber of the battery tray to the recess. This configuration makes it possible for a cavity or free space to respectively exist between the housing bodies of the battery cells as a result of the parallel arrangement of the lithium phosphate cells formed, in particular, cylindrically, said cavity being available for the superposition wave to pass through in the direction of the recess or the recesses in the region of the base of the battery tray, such that that superposition wave can be moved towards the recess or the recesses, and the pressure relief already described above can take place via the recess or the recesses.

Finally, the invention also provides an industrial truck having at least one electrically actuated drive device for driving the industrial truck and/or moving a load, wherein the industrial truck has a battery power supply, as has already been described above. The industrial truck is provided, in particular, for operation in a potentially explosive area.

For example, the industrial truck can be a self-driving forklift vehicle which is formed for driving the forklift vehicle and for raising or lowering the load using a stroke device of the forklift vehicle, and electrical energy is provided by means of the battery power supply described above for driving the vehicle or for manipulating the load.

The invention is described in more detail below by means of the drawings. Here are shown.

Figure 1:
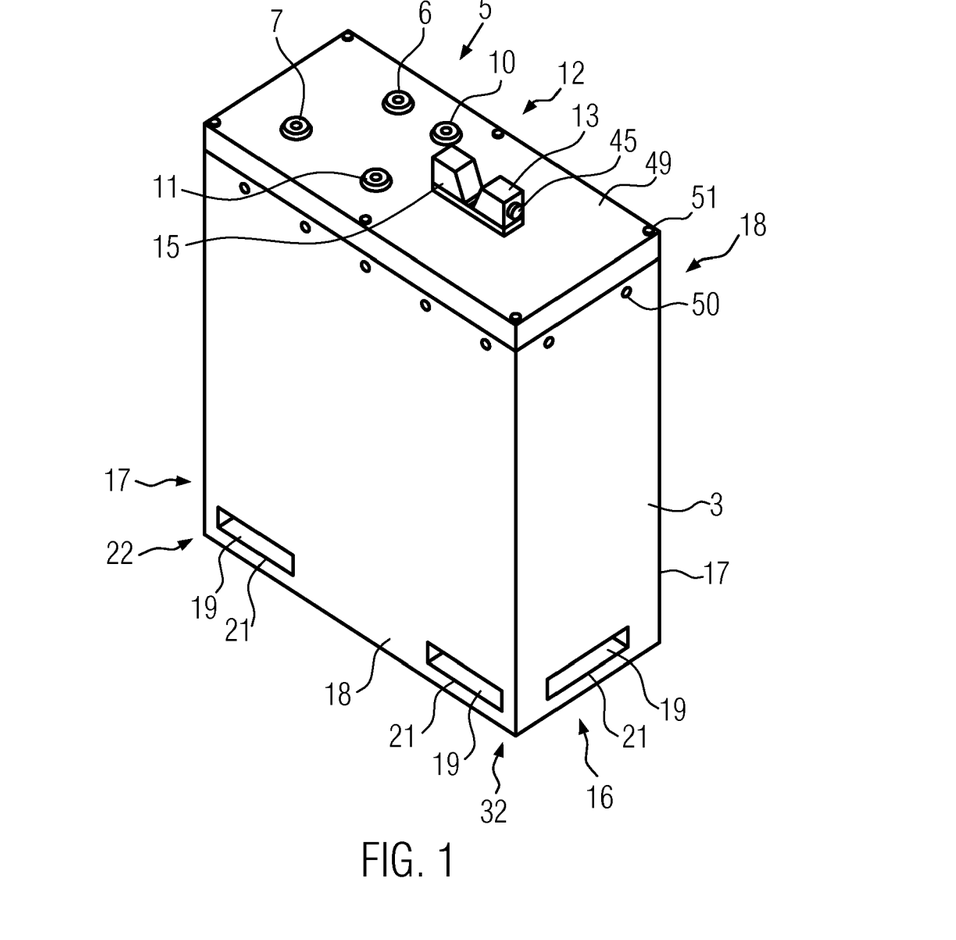
FIG. 1 a perspective depiction of a battery tray of the battery power supply according to an embodiment according to the present invention.

FIG. 1 of the drawings shows a perspective depiction of a battery tray 3 of a battery power supply 1 according to an embodiment according to the present invention.

Figure 4:
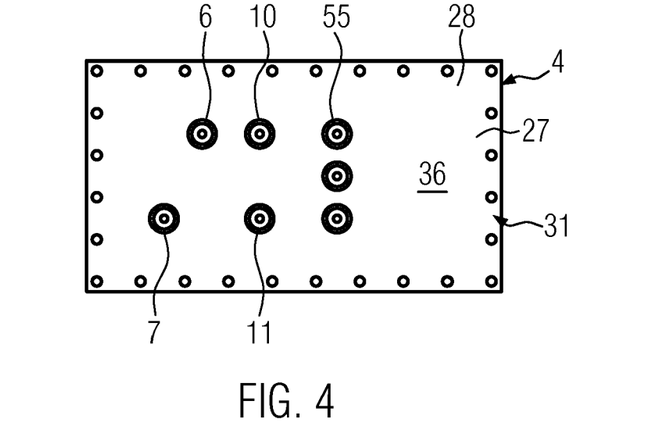
FIG. 4 a top view from above of a lid provided to be arranged on a housing body of the housing of the battery power supply.
Figure 5:
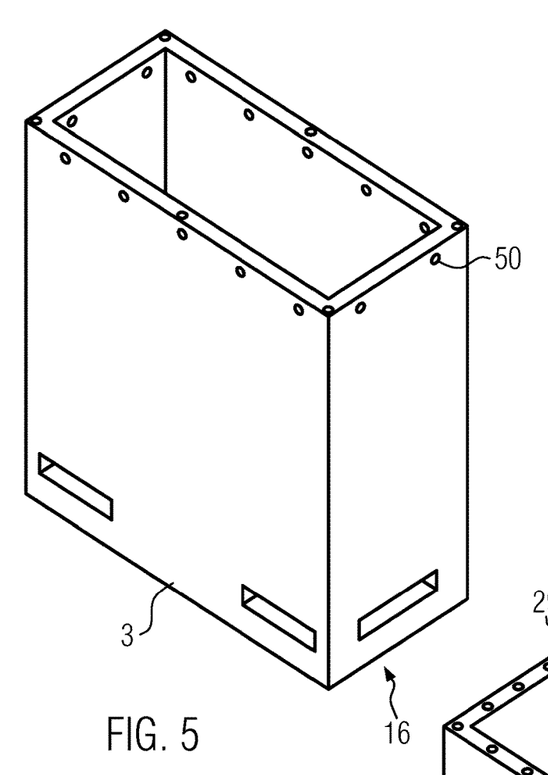
FIG. 5 a perspective depiction of the battery tray.
Figure 9:
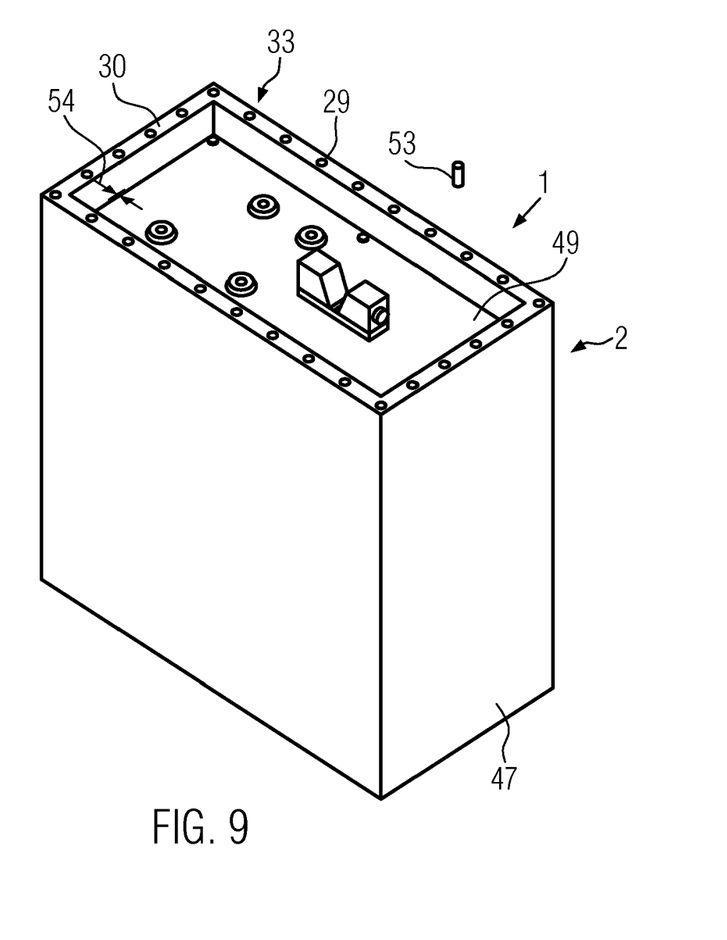
FIG. 9 a perspective depiction of the battery tray arranged in the housing of the battery supply with the lid of the housing.

The battery power supply 1 depicted in the most general sense in FIG. 9 of the drawings has a housing 2 having a housing body 47, which can receive a battery tray 3, which will become clear in more detail by means of FIG. 5 of the drawings, in a receiving space 48 (FIG. 5A) and can receive a lid 4, which will become clear in more detail by means of FIG. 4 of the drawings.

Figure 7:
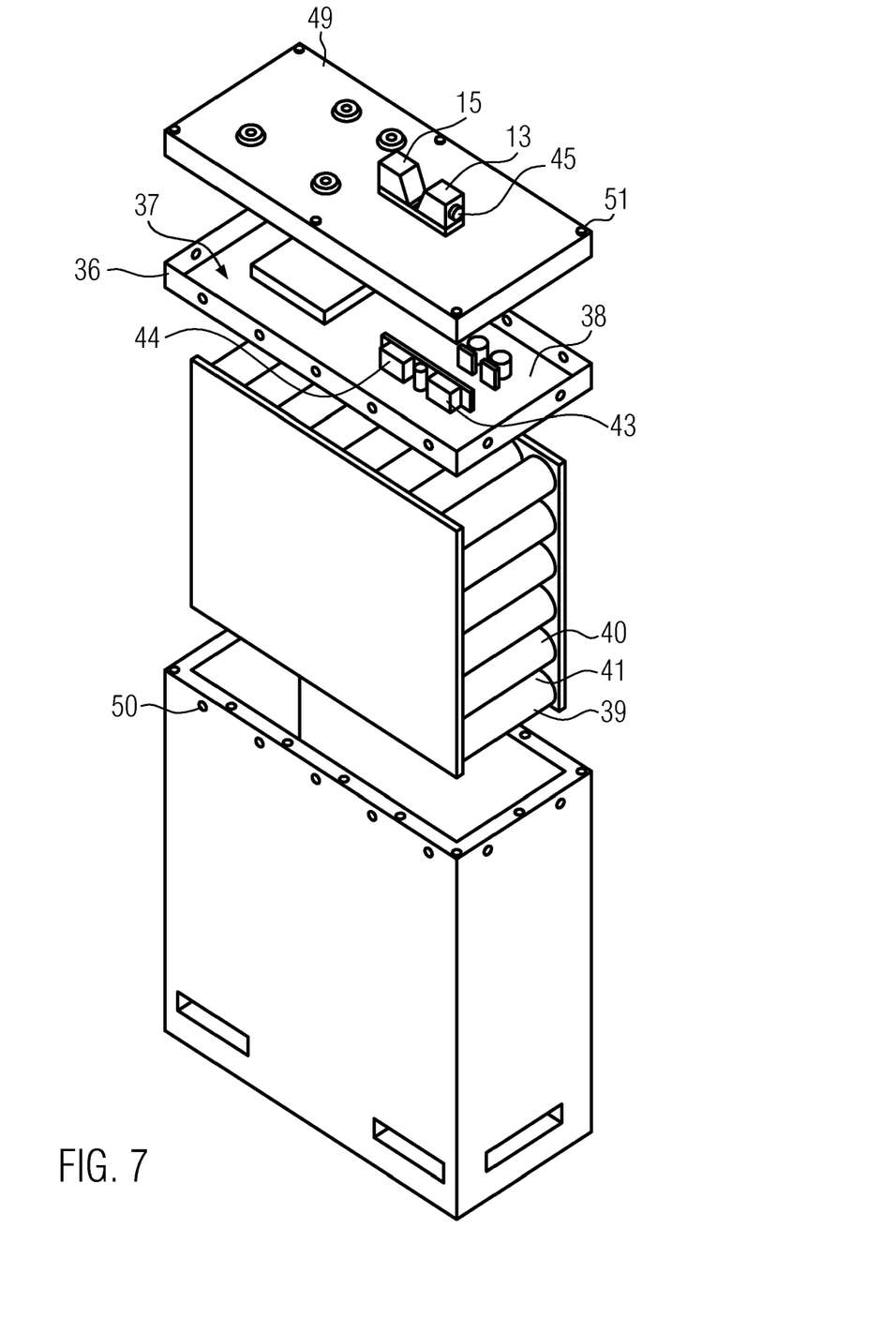
FIG. 7 a perspective exploded depiction of the battery tray having a traction battery arranged therein.
Figure 8:
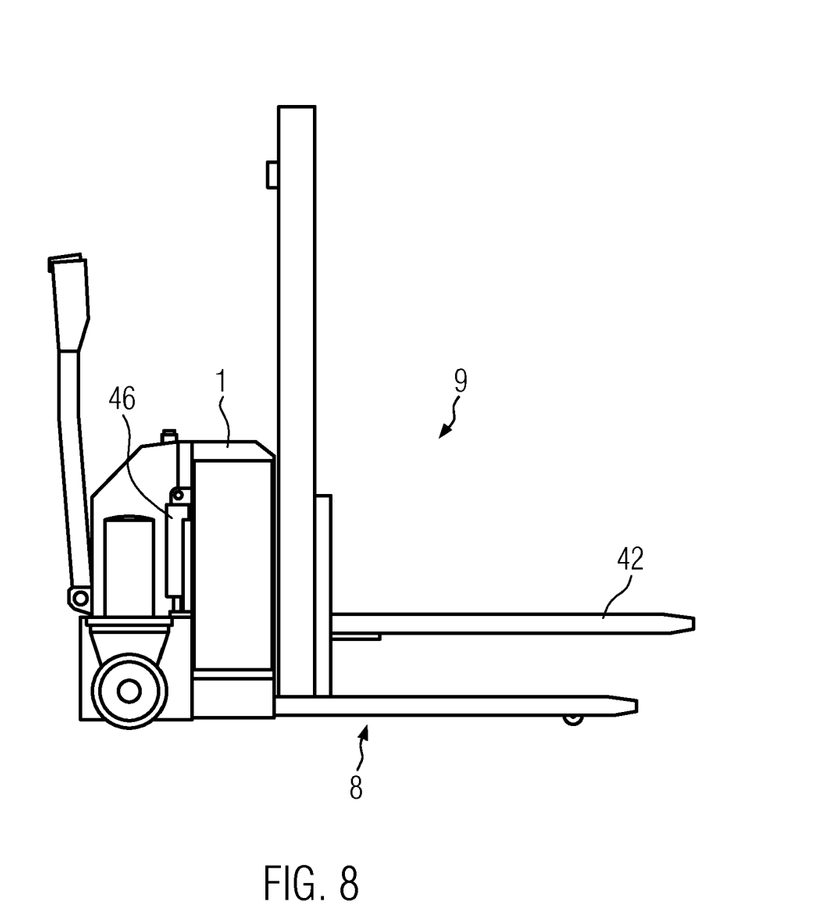
FIG. 8 a side view of an industrial vehicle in the form of a forklift truck having a battery power supply according to the invention arranged thereon.

The battery tray 3 has a battery tray lid 49 (FIG. 7) having cable screw connections 5 in the form of a cable screw connection 6 for providing a negative pole and a cable screw connection 7 for providing a positive pole for the electrical output connection for providing electrical energy for an industrial truck 8, which can be a forklift truck 9 that can be seen more clearly in FIG. 8 of the drawings.

Similarly, a further cable screw connection 10 is provided on the battery tray lid 49 for providing a charging socket for connecting a negative pole and a cable screw connection 11 for providing a charging socket for connecting a positive pole of a charging device not depicted in more detail for charging the traction battery 25.

Figure 6:
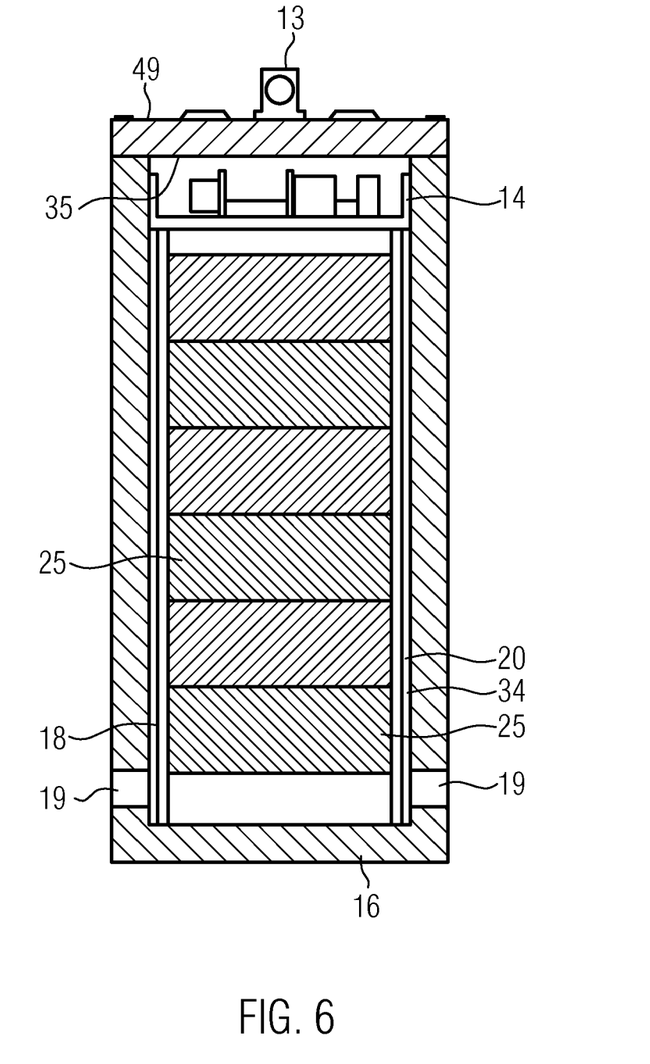
FIG. 6 a cross-section according to the line of intersection VI-VI according to FIG. 2 of the drawings.

Moreover, an interface device 12 only schematically depicted is provided on the battery tray lid 49, said interface device comprising, in the depicted embodiment, a seven-poled data plug 13 for linking a CAN-bus communication connection between an electronic switching device 14, which can be seen more clearly in FIG. 6 of the drawings, and the charging device, and a seven-poled data plug 15, which is formed to link a CAN-bus communication connection between the electronic switching device 14 and the industrial truck 8.

The battery tray 3 has a base 16, as is depicted by way of example by FIGS. 1 and 5 of the drawings, from which in each case two transverse side walls 17 and two longitudinal side walls 18 extend at a right angle in the direction of the battery tray lid 49, wherein, in the depicted embodiment of the battery tray 3, the transverse side walls 17 have a smaller longitudinal extension than the longitudinal side walls 18.

As can be seen in FIG. 1 of the drawings, in the depicted embodiment, the battery tray 3 has a recess 19 on the longitudinal side wall 17 in a region adjacent to the base 16, said recess being formed as a wall aperture 21 and extending from a region or space outside the battery tray 3 into the inner chamber 20 formed in the battery tray 3 (see FIG. 6).

Similarly, a recess 19 is also formed on the transverse side wall 17, which cannot be seen because of the perspective depiction chosen in FIG. 1, in the region of the base 16 of the battery tray 3 and indeed in the form of a wall aperture 21.

The recess 19 of the transverse wall 17 also extends from a region or space outside the battery tray 3 into the inner chamber 20 formed in the battery tray 3.

Moreover, FIG. 1 of the drawings shows that the longitudinal side wall 18 has two recesses 19 in the form of wall apertures 21, and indeed again in the region of the base 16 of the battery tray 3 and, in particular, on opposite end regions 22 of the longitudinal side 18, wherein, in the depicted embodiment of the battery tray 3, the end regions 22 abut on the respective transverse side walls 17.

The longitudinal side wall 18 that cannot be seen because of the perspective chosen in FIG. 1 of the drawings also has two recesses 19 in the form of wall apertures 21, which are formed on the respective end regions of the longitudinal side wall 18 in a manner corresponding to the manner described above and also extend from a region or space outside the battery tray 3 into the inner chamber 20 of the battery tray 3.

Figure 2:
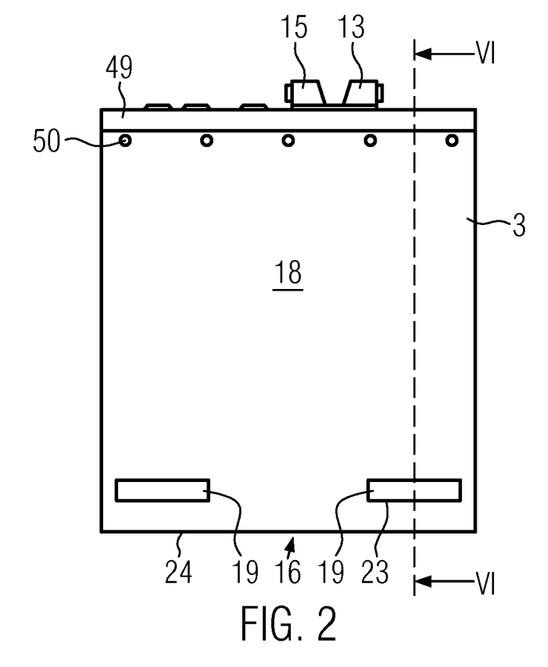
FIG. 2 a side view of the battery tray according to FIG. 1.

FIG. 2 of the drawings shows a side view of the battery tray 3 and a longitudinal side wall 18 having the two recesses 19 formed in the region of the base 16 of the battery tray 3, as has already been described above.

In the depicted embodiment of the battery tray 3 of the battery power supply 1, the recesses 19 each have a rectangular configuration having a longitudinal side extension of 130 mm and a height extension of 25 mm, wherein the recesses 19 each have a lower edge 23, which, when seen from the underside 24 of the battery tray 3, i.e. the underside of the base 16, is respectively spaced apart by 20 mm, such that the configuration already described above is set in such a way that the recesses 19 are each formed in a region adjacent to the base 16.

Figure 3:
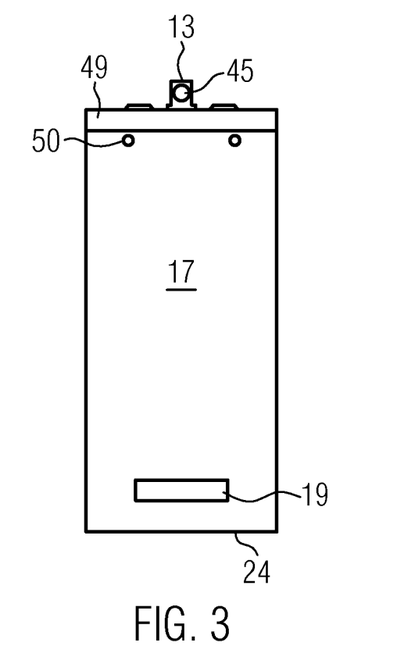
FIG. 3 a front-side view of the battery tray according to FIG. 1.

FIG. 3 of the drawings shows a front-side view of the battery tray 3 with the transverse side wall 17, which, in the region of the base or the underside of the transverse side wall 17, has a rectangular recess 19 which has a longitudinal extension of 130 mm and a height extension of 25 mm and also has a lower edge 23, which has a spacing of 20 mm from the underside 24 of the base 16.

As has already been described above, the opposite transverse side wall 17 has a recess 19, and the opposite longitudinal side wall 18 has two recesses 19, which, on one hand, is arranged in the centre of the longitudinal extension of the transverse side wall 17 and, on the other hand, is arranged on the two end regions 22 of the longitudinal extension of the longitudinal side wall 18.

The configuration and the placing of the respective recesses 19 in the form of wall apertures 21 on the longitudinal side walls 18 and the transverse side walls 17 is chosen in such a way that the pressure can be relieved to a residual pressure level by the recesses 19 because of a possible explosion of a traction battery 25 arranged in the inner chamber 20 of the battery tray 3 (see FIG. 6 of the drawings), said residual pressure level being so low that the housing 2 of the battery power supply 1 is not unintentionally opened by the explosion, i.e. does not burst, for example, and the lid 4 also remains on the housing body 47, i.e. is not raised from the housing body 47, or a cavity is formed between the lid 4 and the housing body 47 of the battery power supply 1, which cavity would permit a penetration or influx of oxygen into the receiving chamber 48 of the house 2.

The configuration and the placing of the respective recesses 19 on the battery tray 3 is particularly chosen in such a way that a pressure excess in the inner chamber 20 of the battery tray 3 of the battery power supply 1, which emerges as a result of an explosion in the inner chamber 20 and emerges as a result of a superimposition wave or superposition wave running back and forth between the base 16 and the battery tray lid 49, does not lead to the violent and unintentional opening of the housing 2, since a pressure excess or pressure peak emerging as a result of an excess pressure wave in the region of the base 16 of the battery tray 3 can be specifically reduced to a residual pressure level by the recesses 19 configured and placed in this way, which leaves the housing 2 of the battery power supply 1 intact in the desired manner, i.e. no openings or gaps appear on the housing 2, which would make it possible for a flame front to spread out of the receiving chamber 48 of the housing. A flame front emerging out of the inner chamber 20 of the battery tray 3 through the recesses 19 is thus prevented by the recesses 19 being arranged in the region of the base 16 of the battery tray 3, as already explained above.

FIG. 4. of the drawings shows a top view from above of the lid 4 of the housing 2.

As can readily be seen, cable screw connections 6, 7, 10, 11 are also arranged on the upper side 26 of the lid 4, which are provided for directing the cable for charging the battery and the power supply to the industrial truck 9, and three further cable screw connections 55 are arranged, which can be cable screw connections Exd and via which linking lines for connecting with the data plugs 13 and 15 and the pilot contact 45 can be arranged on the battery tray lid 49 for data exchange and for communication. A plurality of bores or openings 27 are provided on the lid 4, which are arranged running along an outer peripheral line 28 of the lid 4 and are arranged at a predetermined spacing apart from one another, wherein, in the depicted embodiment of the battery power supply 1 or the lid 4, this spacing has a value of from 55 to 65 mm. All the cable screw connections mentioned in this publication can be such cable screw connections that are provided to be used in potentially explosive areas.

A plurality of screw bolts 53 depicted in FIG. 9 of the drawings can be inserted into the bores 27, said screw bolts being able engage in threaded bores 29 on an upper flange face 30 of the housing body 47, as is depicted in FIG. 9 of the drawings.

The flange face 30 of the housing body 47 and a corresponding flange face or lid face 31 on the underside of the lid 4 are here designed to be finely processed, such that a finely processed cavity surface 33 according to FIG. 9 of the drawings appears between the flange face 30 and the lid face 31, said cavity surface having an average roughness of 6.3 μm and a cavity surface width of 30 mm. The screw bolts 53 are screwed to the threaded bores 29 with a high pretension force, and the finely processed cavity surface 33 ensures that, in the event of an explosion in the inner chamber 20 of the battery tray 3, a flame front cannot spread through the cavity surface 33 in the direction of the outside of the battery housing 2, and an influx or inflow of oxygen via the finely processed cavity surface 33 into the receiving chamber 48 and interior chamber 20 is avoided, and, because of this oxygen consumption of the flame front spreading out in the inner chamber 20 in the direction of the lid 4, the flame front is automatically extinguished.

FIG. 6 of the drawings shows a sectional depiction of the battery tray 3 according to the intersection VI-VI according to FIG. 2 of the drawings.

The battery tray 3 has a base 16 having longitudinal sides 18 arranged thereon, in which the recesses 19 are formed in the form of the wall apertures 21, which extend from outside the battery tray 3 into the inner chamber 20.

The traction battery 25 only schematically depicted in FIG. 6 of the drawings is located with arrangement in the inner chamber 20, which is explained in more detail below by means of FIG. 7 of the drawings.

The arrangement of the traction battery 25 in the inner chamber 20 is here chosen in such a way that a free space or empty space 34 remains between the outer surfaces of the traction battery 25 and the recesses 19, said empty space making it possible for a pressure wave triggered by an explosion in the inner chamber 20 to spread out in the direction of the recesses 19. In this way, it is achieved that a superposition wave can also spread out in the direction of the recesses 19, and a pressure amplitude triggered by the superposition wave can be relieved by a partial pressure relief between the inner chamber 20 and the surroundings of the battery tray 3 in the receiving chamber 48 of the housing 2, such that a residual pressure level remains in the inner chamber 20 and receiving chamber 48 which is lower than a predetermined bursting pressure of the battery housing 2, and thus a bursting of the battery housing 2 or a regional splitting open of the battery housing 2 and an uncontrolled releasing of the lid 4 of the battery housing 2 is avoided.

Moreover, as can be seen in FIG. 6 and FIG. 7 of the drawings, an intermediary lid 36 that can be releasably placed on the battery tray lid 49 and can be seen in more detail in FIG. 7 of the drawings is arranged between the inner chamber 20 and the underside 35 of the battery tray cover 49, said intermediary lid forming a receiving chamber 37 between the upper side 39 of the intermediary lid and the underside 35 of the battery tray lid 49. The intermediary lid 36 can be fixed on the longitudinal sides and transverse sides of the battery tray 3 by means of schematically depicted screw connections 50, and the battery tray lid 49 can be fixed on the battery tray 3 by means of schematically depicted screw connections 51.

The electronic circuit device or printed circuit board 14 can be arranged in the receiving chamber 37, said printed circuit board having already been explained above and having a circuit for monitoring the state of the traction battery 25 or the battery cells of the traction battery 25 and simultaneously being able to be switched via a pilot contact 45 arranged on the data plug 13 in such a way that it can be switched without power, for example by means of a contactor 43 integrated into the circuit for the load power circuit and a contactor 44 integrated into the circuit for the charging power circuit, or by means of switching switchable contactors 43, 44 of the load power circuit for operating the industrial truck 8, and the charging power circuit can be interconnected for recharging the traction battery in such a way that the load current circuit is without power with the switched charging power circuit, and an operation of the industrial truck 8 and simultaneously charging the traction battery 25 is avoided.

FIG. 7 of the drawings shows a perspective explosion depiction of the battery tray 3 having the traction battery 25 arranged therein. The traction battery 25 has a plurality of lithium iron phosphate cells $LiFePO_4$ 39, which are each formed as cylindrical bodies 40, and empty spaces or free spaces 41 are respectively formed between the cells 39, said free spaces serving the passage of the pressure wave already explained above multiple times which can spread out through the empty spaces 41 in the direction of the recesses 19, and, in this way, the partial pressure relief already stated out of the inner chamber 20 in the direction of the region outside the battery tray 3 can take place.

Figure 5A:
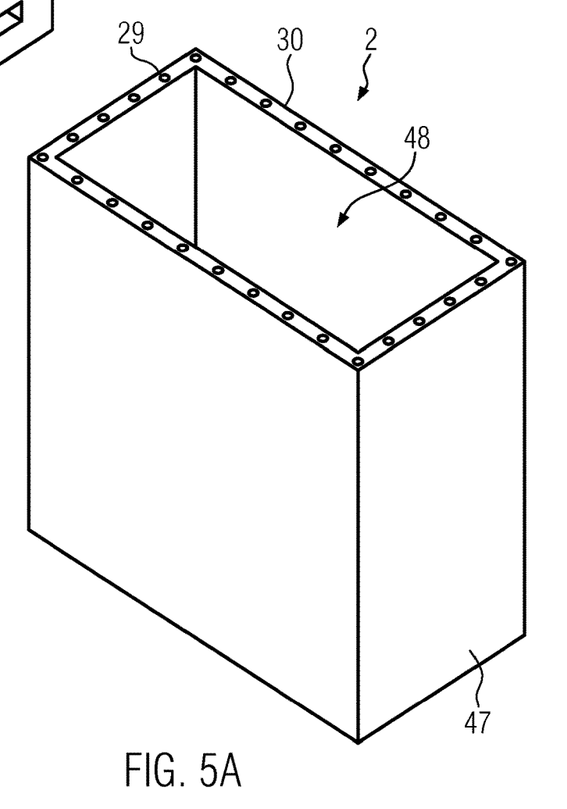
FIG. 5A a perspective depiction of the housing body of the housing of the battery power supply.

FIG. 5A of the drawings shows a perspective depiction of the housing body 47 of the housing 2 of the battery power supply 1 having the finely processed flange face 30 formed on the upper side of the housing 47 and having the plurality of the threaded bores 29, with which the lid 4 depicted in FIG. 4 of the drawings can be releasably placed in the threaded bores 29 by means of a screw engagement of the screw bolts 53 depicted in FIG. 9 of the drawings.

FIG. 9 of the drawings shows a perspective depiction of the battery power supply 1 having the battery tray 3 arranged in the receiving chamber 48, wherein, in the chosen depiction, the lid 4 of the housing 2 of the battery power supply 1 has been left out. By arranging the lid 4 on the flange face 30, the cavity surface 33 already mentioned above is formed, which prevents an influx of oxygen into the inner chamber 20 of the battery tray 3, such that a flame front emerging as a result of an explosion in the inner chamber 20 is automatically extinguished by the oxygen consumption and cannot escape to the outside of the housing 2 of the battery power supply 1. The outer walls of the battery tray 3 respectively form an intermediary chamber 54 with the inner walls of the housing body 47, which serves as an explosion chamber for the pressure relief out of the inner chamber 20 of the battery tray 3.

FIG. 8 of the drawings shows a forklift truck 9 provided with the battery power supply 1 according to the invention, said forklift truck being provided as an industrial vehicle for operating in a potentially explosive area of an industrial plant or similar.

The forklift truck 9 can be moved by means of the battery power supply 1 in an electromotive manner, and the load receiving means 42 can be raised and lowered by means of a schematically depicted electric drive motor 46 of the forklift truck 9 in an electromotive manner. Here, the electrical energy for operating the forklift truck 9 is provided by means of the battery power supply 1 according to the invention, which is characterised in that the capacity of the battery power supply 1 is sufficient for the entire day shift of the industrial truck 8 and thus, for the duration of the entire shift, it is not necessary to subject the battery power supply 1 to a recharging process of the traction battery 25.

According to the invention, the battery power supply is provided for use in a potentially explosive area and fulfils the ignition protection type regulations mentioned above and, in particular, is approved for the 2G and 2D device category according to the ATEX directive 2014/34/EU and is provided for use in zones having gas and dust. In particular, it fulfils the regulations of explosion group II and its subsidiary groups IIA, IIB and IIB+$H_2$ and, in particular, is characterised in that a superposition wave occurring as a result of any explosion in the housing of the battery power supply also does not lead to the housing bursting; instead, an excessive pressure accompanying the superposition wave is relieved to a residual pressure level, which does not lead to the housing being destroyed and, in particular, does not lead to the lid of the battery housing being opened or ripped away, which would result in there no longer being any protection from explosions.

In the course of test explosions carried out using a gas mixture for testing purposes of the battery power supply according to the invention, it has been shown that pressure peaks of 21.8 bar emerged in the inner chamber of the housing as a result of superposition of pressure waves, and these pressure peak values could be lowered by means of the design of the battery power supply according to the invention to a value of below 8 bar, and thus a bursting of the housing and an unintentional detachment of the lid of the housing could be avoided, such that the explosion protection could be maintained according to the object.

Moreover, the design of the battery power supply according to the invention also ensures that weight plates or mass plates, which up until now were necessary to increase the stability of industrial trucks provided with known battery power supplies, can be omitted.

The lid of the housing of the battery power supply according to the invention is characterised by type-tested cable screw connections of the 2G/2D device category according to the ATEX directive mentioned above, by means of which both the battery cable for charging the traction battery and the battery cable for providing energy for the industrial truck can be guided. Communication lines, CAN-bus lines or lines for the transmission of data and/or signals between the traction battery and/or an electronic circuit device of the battery power supply according to the invention and external devices, circuits or apparatus can be guided through the cable screw connections, as well as lines for providing electrical energy for electric drive motors of an industrial truck.

In comparison with lead-acid batteries used up until now, lithium iron phosphate cells provided for use with the battery power supply according to the invention ensure a considerable gain of provided electrical capacity of the battery power supply, such that charging can achieve a capacity of around 200 ampere-hours, for example.

The load circuits of the traction battery are split into a load circuit controlled by a contactor for driving the industrial truck and raising or lowering load receiver means of the industrial truck and a load circuit for charging the traction battery, which is fused via a contactor. The two load circuits are technically separated from each other, such that the industrial truck is prevented from being able to move during the charging process of the traction battery. Similarly, it is ensured that the linking devices provided on the battery power supply for charging the traction battery are without power during the operation of the traction battery for emitting electrical energy for the operation of the industrial truck.

By means of a pilot contact of the charging device provided on a linking device of the battery power supply, provision is made for a charging power circuit for the traction battery to be closed via the actuation of a charging protector or contactor, a contactor to switch the load current circuit for emitting electrical energy to the industrial truck without power, and thus the charging of the traction battery to be possible, yet a simultaneously discharging of the traction battery via the load circuit to no longer be possible.

By closing the pilot contact, a data exchange via the CAN bus communication interface mentioned above between the electronic circuit device of the battery power supply and an external charging device is initiated, such that a charging cycle can be carried out according to the charging state of the lithium iron phosphate cells provided to form the traction battery by using a charge balancing process.

The finely processed cavity surface formed between the lid and the housing of the battery power supply ensures that an influx or inflow of oxygen into the inner chamber or receiving chamber of the housing in the event of the formation of a flame front after an explosion inside the battery tray is prevented, and thus the flame front is automatically extinguished.

In terms of features of the invention not individually explained above in more detail, generally, reference is explicitly made to the claims and the drawings.

LIST OF REFERENCE NUMERALS

1. Battery power supply
2. Housing
3. Battery tray
4. Lid
5. Cable screw connection
6. Cable screw connection
7. Cable screw connection
8. Industrial truck
9. Forklift truck
10. Cable screw connection
11. Cable screw connection
12. Interface device
13. Data plug
14. Circuit device/printed circuit board
15. Data plug
16. Base
17. Transverse side wall
18. Longitudinal side wall
19. Recess
20. Inner chamber
21. Wall aperture
22. End region
23. Lower edge
24. Underside
25. Traction battery
26. Upper side
27. Bore
28. Outer peripheral line
29. Threaded bore
30. Flange face
31. Lid face
32. End regions
33. Cavity faces
34. Free space/empty space
35. Underside
36. Intermediary lid
37. Receiving chamber
38. Upper side
39. Lithium iron phosphate cells
40. Body
41. Free space/empty space
42. Load receiving means
43. Contactor
44. Contactor
45. Pilot contact
46. Drive motor
47. Housing body
48. Receiving chamber
49. Battery tray lid
50. Screw connections
51. Screw connections
53. Screw bolts
54. Intermediary cavity
55. Cable screw connection

The invention claimed is:

1. A battery power supply (1) for an industrial truck (8) used in a potentially explosive area, the power supply comprising:
    a housing (2) having a housing body (47) and a housing lid (4), wherein the housing body (47) has a receiving chamber (48) for receiving a battery tray (3), which battery tray has an inner chamber (20) having a traction battery (25) arranged therein, and the housing lid (4) is releasably fixable on the housing body (47) by securing means (53), and wherein the battery tray (3) has a battery tray lid (49) and a base (16) having transverse walls (17) and longitudinal walls (18) extending away from the base (16); and
    at least one of the walls (17, 18) has, in a region adjacent to the base (16), a recess (19) penetrating the at least one wall (17, 18) into the inner chamber (20).

2. The battery power supply (1) according to claim 1, wherein, in a top view, the base (16) has a rectangular configuration having longitudinal sides and transverse sides, and the longitudinal sides have a longitudinal extension that is greater than the longitudinal extension of the transverse sides, and, to form the inner chamber (20), the walls (17, 18) extend away from the base (16) at an angle thereto, and the transverse walls (17) arranged on the transverse sides have a penetrating recess (19) in the region of the center of the longitudinal extension of the respective transverse wall (17), and the longitudinal walls (18) arranged on the longitudinal sides respectively have two penetrating recesses (19) on opposite end regions (22) of the longitudinal sides of the respective longitudinal wall (18).

3. The battery power supply (1) according to claim 2, wherein the penetrating recesses (19) are formed as rectangular wall apertures (21) penetrating the respective transverse wall (17) or longitudinal wall (18).

4. The battery power supply (1) according to claim 3, wherein the recesses (19) are formed on a base-side end region of the inner chamber (20) of the battery tray (3), and have an entire surface which reduces a test explosion inner pressure emerging as a result of a test explosion triggered in the housing (2) as part of a type-testing of the housing (2) to a permissible inner pressure prevailing in the battery tray (3), which is smaller than an explosion inner pressure that opens the battery tray (3) and/or the housing (2).

5. The battery power supply (1) according to claim 4, wherein the recesses (19) are on the base-side end region of the inner chamber (20) of the battery tray (3) above the base (16) in a region at which a superposition wave occurs, which is caused by an explosion triggered in the housing (2).

6. The battery power supply (1) according to claim 1, further comprising a finely processed cavity surface (33), having a predetermined cavity surface width and an average roughness of less than or equal to 6.3 µm, formed between a lid surface (31) facing towards the housing body (47) and a surface of the housing body (47) facing towards the housing lid (4).

7. The battery power supply (1) according to claim 1, wherein the housing lid (4) is releasably placed on the housing body (47) by means of a plurality of screw connections (53), and the screw connections (53) are provided running along an outer peripheral line (28) of the housing lid (4) and are at a predetermined spacing apart from one another.

8. The battery power supply (1) according to claim 1, further comprising an intermediary lid (36), releasably fixed on the battery tray (3), is provided between the receiving chamber (48) and an underside (35) of the battery tray lid (49), said intermediary lid forming a receiving chamber (37) between an upper side (38) of the intermediary lid (36) and the underside (35) of the battery tray lid (49) and being formed to receive an electronic circuit (14).

9. The power supply (1) according to claim 8, further comprising cable screw connections (5, 6, 7, 10, 11) for providing an electrical charging connection for charging the traction battery (25) and an electrical output connection for providing electrical energy for the industrial truck (8).

10. The battery power supply (1) according to claim 8, further comprising a load power circuit switchable by a contactor (43) for the operation of the industrial truck (8), and a charging power circuit switchable by a contactor (44) for charging the traction battery (25).

11. The battery power supply (1) according to claim 10, further comprising an externally switchable linking device (45) coupled to the contactors (43, 44) such that an external circuit alternately switches the load power circuit without power and interconnects the charging power circuit such that the charging power circuit is without power with a switched load power circuit.

12. The battery power supply (1) according to claim 8, further comprising an interface device (12) for exchanging data and/or signals between the electronic circuit (14) functionally coupled to the traction battery (25) and an external charging device for charging the traction battery (25).

13. The battery power supply (1) according to claim 1, wherein the traction battery (25) comprises a plurality of lithium iron phosphate cells (39) arranged extensively in parallel to the base (16) of the battery tray (3), and further comprising empty spaces (41) between the cells (39) for gaseous fluid to pass out of the inner chamber (20) to the recess (19).

14. An industrial truck (1) having at least one electrically actuated drive device for driving the industrial truck (8) and/or moving a load, comprising a battery power supply (1) according to claim 2.

15. The battery power supply (1) according to claim 12, wherein the interface device (12) comprises a CAN-bus interface.

16. The battery power supply (1) according to claim 9, further comprising a CAN-bus interface device for exchanging data and/or signals between the electronic circuit (14) functionally coupled to the traction battery (25) and an external charging device for charging the traction battery (25).

17. The battery power supply (1) according to claim 10, further comprising a CAN-bus interface device for exchanging data and/or signals between the electronic circuit (14) functionally coupled to the traction battery (25) and an external charging device for charging the traction battery (25).

18. The battery power supply (1) according to claim 11, further comprising a CAN-bus interface device for exchanging data and/or signals between the electronic circuit (14) functionally coupled to the traction battery (25) and an external charging device for charging the traction battery (25).

* * * * *